Jan. 5, 1960    F. D. MARASSO    2,919,664
DOUGH MOLDING MACHINE
Filed Feb. 10, 1954    5 Sheets-Sheet 3
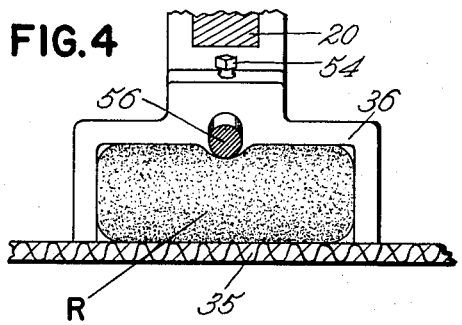
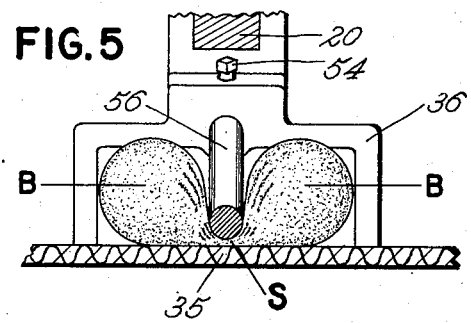
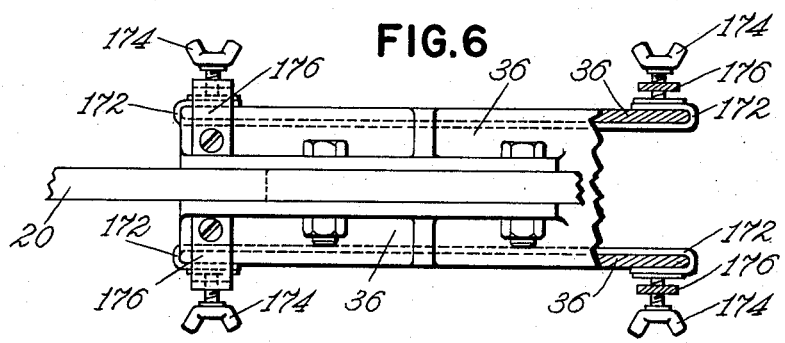
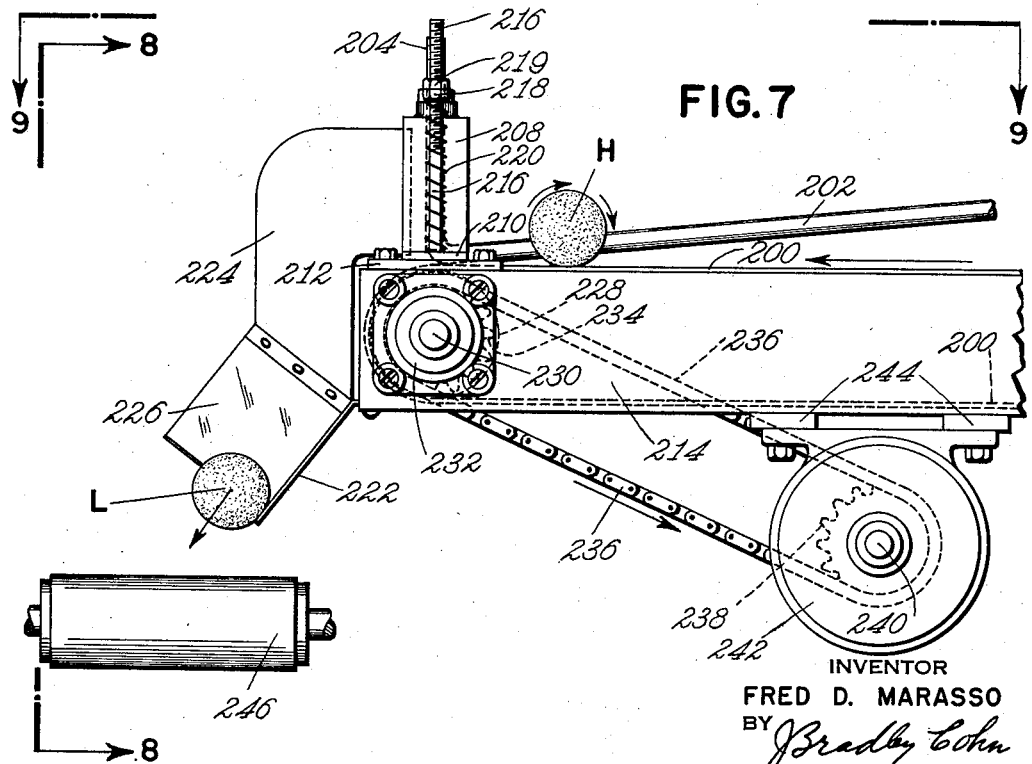
INVENTOR
FRED D. MARASSO
BY Bradley Cohn
ATTORNEY Jan. 5, 1960 F. D. MARASSO 2,919,664
DOUGH MOLDING MACHINE
Filed Feb. 10, 1954 5 Sheets-Sheet 4

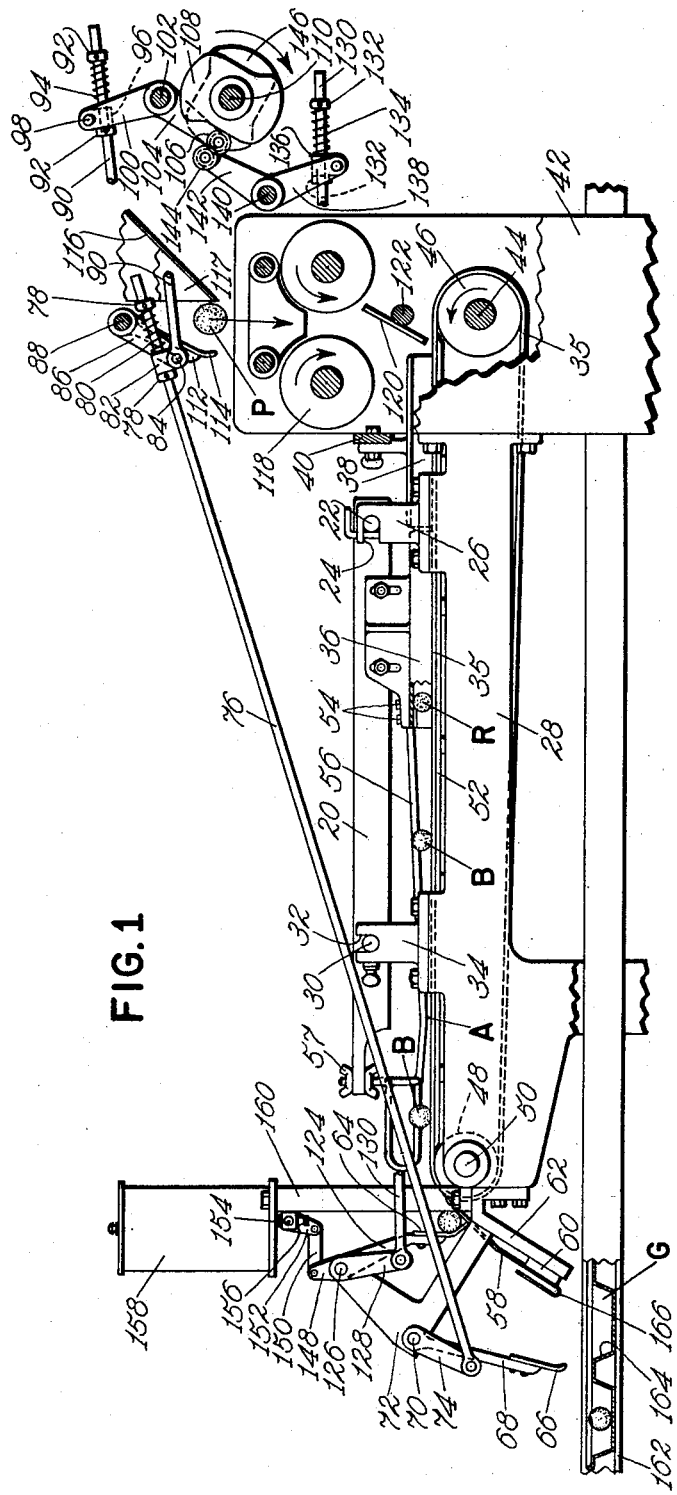

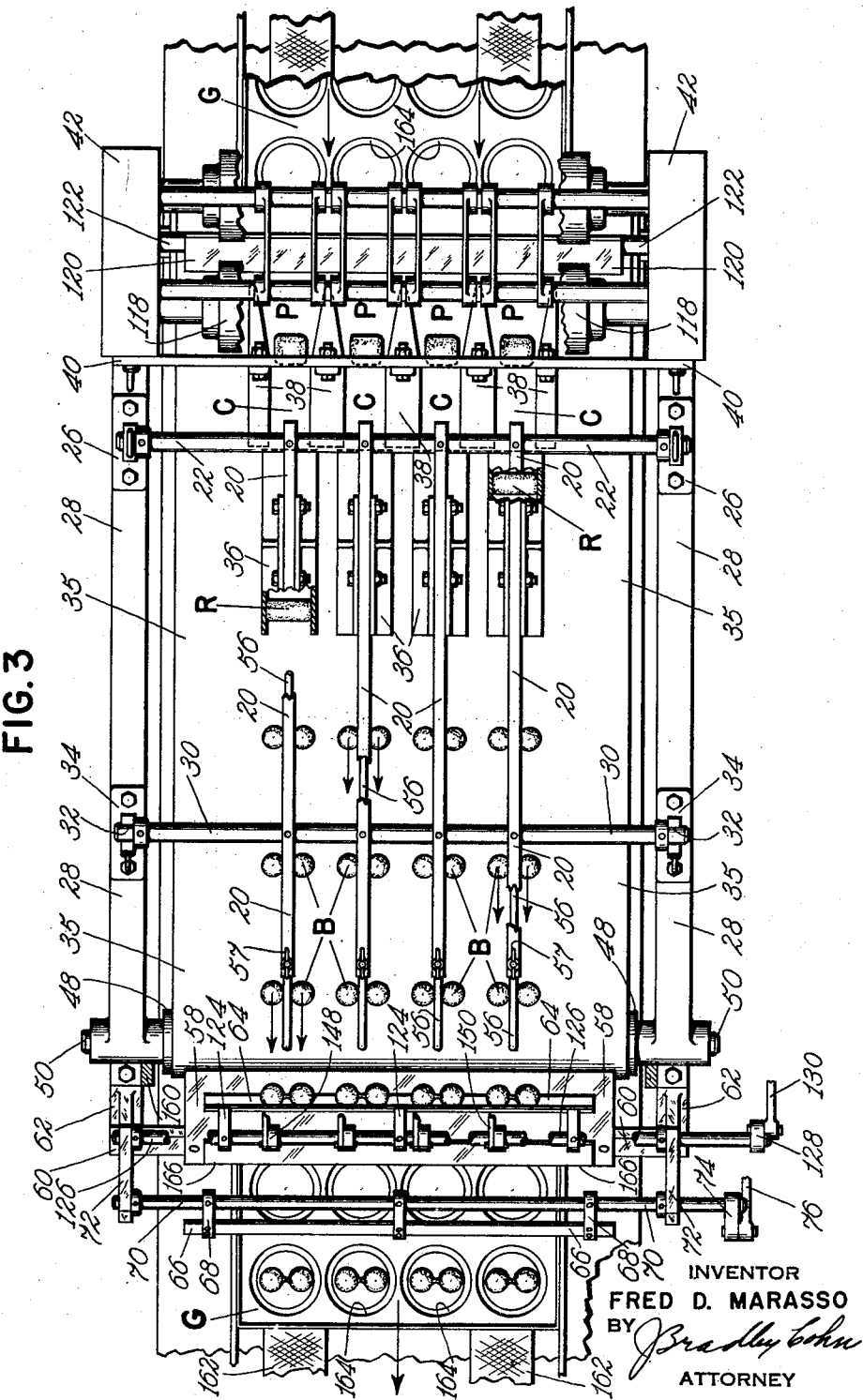

INVENTOR
FRED D. MARASSO
BY Bradley Cohn
ATTORNEY

Jan. 5, 1960  F. D. MARASSO  2,919,664
DOUGH MOLDING MACHINE
Filed Feb. 10, 1954  5 Sheets-Sheet 5
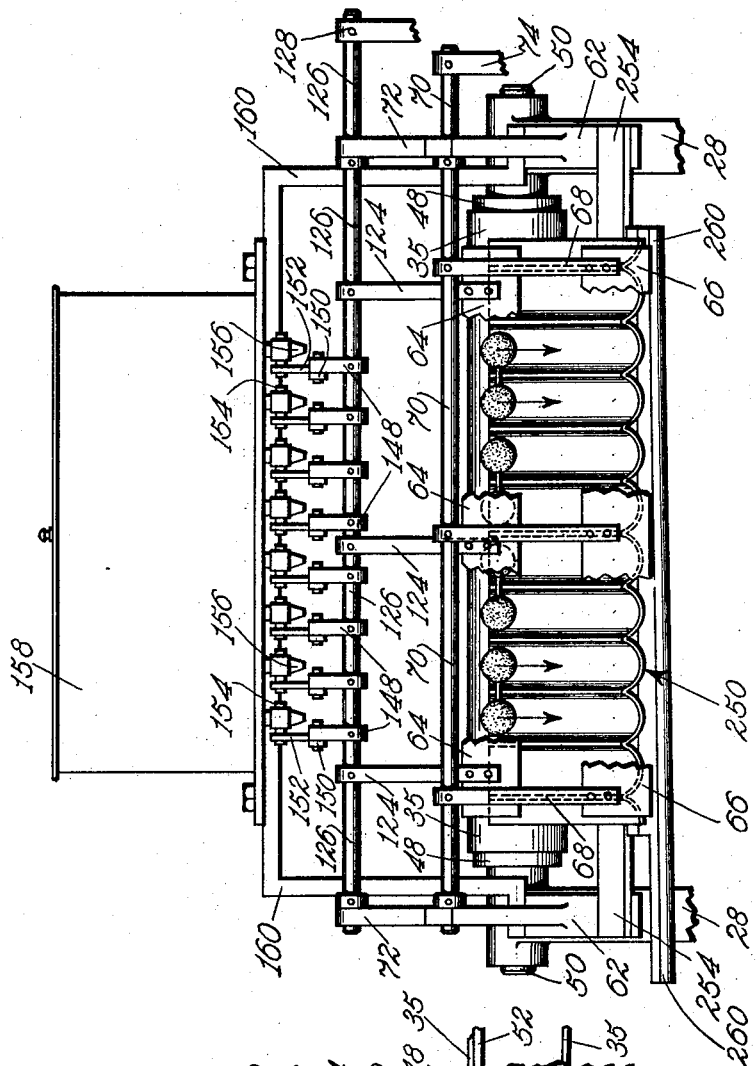
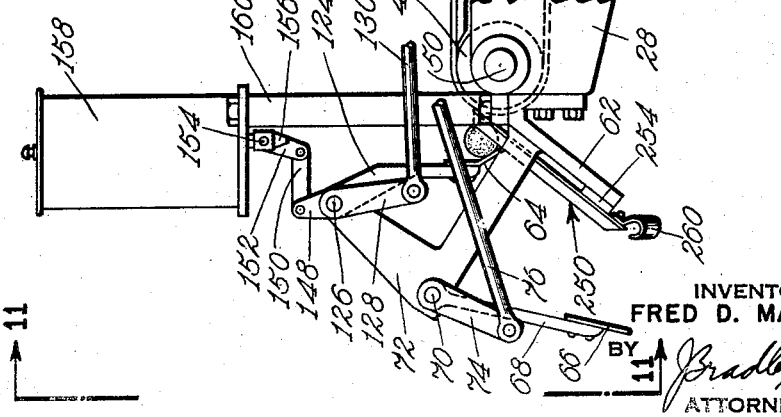
INVENTOR
FRED D. MARASSO
BY Bradley Cohn
ATTORNEY United States Patent Office 2,919,664
Patented Jan. 5, 1960

2,919,664

DOUGH MOLDING MACHINE

Fred D. Marasso, Joliet, Ill., assignor, by mesne assignments, to American Machine & Foundry Company, New York, N.Y., a corporation of New Jersey Application February 10, 1954, Serial No. 409,301

12 Claims. (Cl. 107—9)

This invention relates to molding and panning. More particularly it relates to a modified molding arrangement designed to mold twin dough lumps to produce twin or split rolls. With this type of roll it is desired to place two small rolls of dough in each pan cup or, in the case of flat pans, to place the rolls of dough in groups of two. In a molding and panning device, it is impractical to construct a machine that will index two separately molded balls into each cup.

Accordingly, it is an object of this invention to modify a molding board for an automatic molding and panning machine so that twin rolls of dough connected by a small "string" of dough is produced instead of a single round ball. Heretofore, it has been proposed to locate knives at the end of a molding board to sever a dough lump in half. But this has several undesirable features such as bleeding from the "wound" caused by the knife.

Therefore, it is a further object of this invention to divide a lump of dough while molding it and without fracturing the skin during the splitting or dividing.

A further object of this invention is to design a modified molding board consisting of longitudinal rods positioned above the molding conveyor so that a dough lump may be divided and molded.

A still further object of the invention is to produce in a molding operation a dumb-bell shaped Siamese twin dough lump which may be panned as a single unit.

It is also an object of my invention to form split dough balls without reducing the capacity of the molding or rounding machine. That is, I have devised a means to divide and mold large dough lumps into splits without in any way injuring or wounding the skin of the dough lump.

The novel features which I believe to be characteristic of my invention are set forth with particularity in the appended claims. My invention itself, however, both as to its organization and method of operation may be understood by reference to the following description taken in connection with the accompanying drawings, in which:

Fig. 1 is a side elevation, partly in section, of the twin roll bar attachment shown in conjunction with an automatic molding and panning machine;

Fig. 2 is a partial sectional side elevation illustrating the molding channel and dividing rod of the twin roll attachment;

Fig. 3 is a plan view of the twin roll attachment in conjunction with the automatic molder and panner;

Figs. 4 and 5 are sectional end elevations illustrating the making of a twin roll from a single dough piece by means of the inclined dividing and molding rod;

Fig. 6 is a plan view, partly in section, of a modified molder channel with detachable liner to accommodate various sizes of dough pieces;

Fig. 7 is a side elevation of an embodiment of my invention for producing split loaves in bread manufacture;

Fig. 10 is a side elevation of the delivery end of the twin roll attachment, illustrating a modified delivery plate, and Fig. 11 is an end elevation taken on line 11—11 of Fig. 10.

Figure 8:
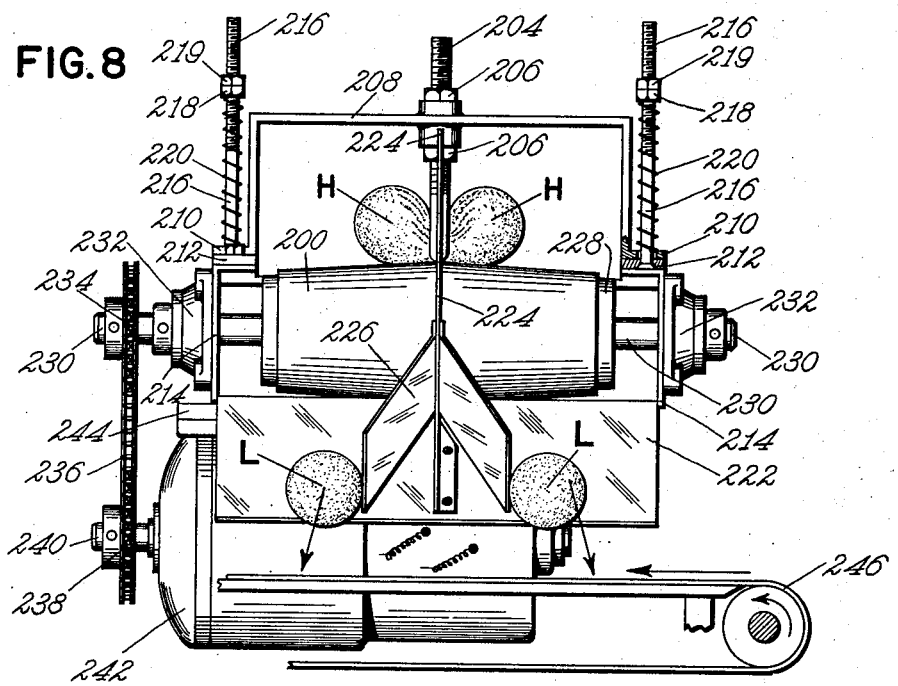
Fig. 8 is an end elevation taken on line 8—8 of Fig. 7.

With reference to the drawings, a plurality of evenly spaced parallel horizontal supporting members 20 are secured at one end to a horizontal shaft 22. Shaft 22 is detachably supported at each end in a horizontal slot 24 of a bracket 26 mounted on the main frame 28 of a machine of the type shown in my application Serial No. 262,744, now Patent No. 2,750,899. The invention, of course could be applied to any molding or panning machine. The other ends of members 20 are secured to another horizontal rod 30 supported in vertical slots 32 of a pair of brackets 34 also mounted on the main frame 28 of the machine. A plurality of H-shaped molding channels 36 are adjustably suspended from each of the members 20 above an endless continuously moving conveyor belt 35. Each channel 36 butts its leading end against the end of a guide channel C formed by suitable rails or guide members 38 mounted on and suspended over the conveyor belt 35 from a horizontal supporting bar 40 secured to housings 42 of the frame structure of the machine.

Housings 42 enclose the driving means and form the bearings for a horizontal shaft 44 carrying a drive pulley 46 for conveyor belt 35. Belt 35 at the other end is led over an idler roller 48 mounted on a shaft 50 supported in suitable bearings in frame 28. The upper run of conveyor belt 35 is supported by a table plate 52 secured to the frame 28 of the machine.

The leading end of each divider rod 56 is secured to the trailing end of each molding channel 36 by means of set screws 54 (Fig. 2). Divider rods 56 slope downward towards conveyor belt 35 (Figs. 1, 2, 4 and 5) to a point A a short distance above said belt and then slope slightly upward, as illustrated in Fig. 1. Near its trailing end the divider rod 56 is adjustably secured to the trailing end of the horizontal supporting member 20. Adjustment of the height at point A may be made by wing nuts 57. Adjacent the delivery end of the conveyor belt 35 is mounted an inclined delivery plate 58 supported by a cross bar 60 secured to suitable brackets 62 mounted on the end of frame 28. In conjunction with the slanted delivery plate are arranged two alternately operating gates 64 and 66. Gate 66 is secured to a plurality of suitable arm 68 mounted on a horizontal shaft 70 rotatably supported at its end in suitable bearings of a pair of brackets 72 which may be attached to or integral with brackets 62 mentioned above. Gate 66 and arms 68 are activated through a lever 74 mounted on shaft 70 and operated by a connecting rod 76 (Fig. 1). The other end of rod 76, by means of a pair of collars 78 and a spring 80 is yieldingly connected to a lug 82 pivotally held by a stud 84 carried by an arm 86 mounted on a horizontal cross-shaft 88 suitably supported in bearings of a frame structure (not shown) of the machine.

To the stud 84 carried by arm 86 is also pivotally attached one end of a connecting rod 90 whose other end is yieldingly connected by means of a pair of collars 92 and a tension spring 94 to a lug 96 pivotally attached to a stud 98 on the free end of an arm 100 mounted on a shaft 102 also supported in bearings of a suitable frame structure (not shown) of the machine. The arm 100 is operated by an integral cam lever 104 engaging its roller 106 with a cam 108 on continuously rotating shaft 110 driven from the main drive (not shown) of the machine.

Shaft 88 is thus oscillated by cam 108 through cam lever 104, arms 100, rod 90 and arm 86. A plurality of arms 112 which carry a gate 114 are mounted on shaft 88. Gates 114 control the timing of the delivery of dough pieces P from a chute 116 through a pair of rotating rollers 118 onto deflector plate 120 and conveyor belt 35. Plate 120 is secured to a stationary cross shaft 122 held at each end by the two housings 42.

The gate 64 is mounted on a plurality of arms 124 secured to a cross shaft 126 supported at each end in suitable bearings of bracket 72. A lever 128 is secured to shaft 126 and articulated with a rod 130 yieldingly connected by means of two collars 132 and a spring 134 to a lug 136 pivotally attached to an arm 138 mounted on a shaft 140. On shaft 140 there is also a cam lever 142 carrying on its free end a cam roller 144 which engages a cam 146 on cam shaft 110.

Shaft 126 also carries a plurality of levers 148 (Figs. 1 and 11) each of which by means of a link 150 is connected to a valve control arm 152 mounted on a valve stem 154 of a valve faucet 156. Their operation is timed with the gate 64 so that oil may be dropped into the crevices of the split dough pieces as they are momentarily held by gate 64. The tank is supported by and mounted on a U-shaped bracket 160 secured to the brackets 62 (Figs. 1 and 11).

In operation, the twin roll bar attachment described above and shown in Figs. 1 through 5 of the drawings may be used in conjunction with a combined divider, proofer, molder and panner such as is illustrated and described in my co-pending application Serial No. 262,744, now Patent No. 2,750,899 in which spaced rows of dough pieces are delivered to the inclined chute or aligning channel 116 which extends over the entire width of the machine. I have illustrated so much of that machine as is necessary for an understanding of the invention.

The inclined chute 116 is provided with a plurality of spaced vertical guide members or ribs 117 which are employed for controlling the lateral spacing of the dough pieces in each row. The gate 114 aligns each row of dough pieces and by proper timing spaces and locates each row on conveyor belt 35 below. Each dough piece P after dropping from guide chute 116 will fall into its own guide channel C (Fig. 3).

Continuously moving conveyor belt 35 carries the dough pieces P through their own guide channels C into the individual U-shaped molding channels 36 where they are rolled into a cylindrical dough piece R (Figs. 2 and 4). The rods 56 engage the center portion of dough pieces R (Fig. 4). As the roll R advances with belt 35, the rod (Fig. 2) depresses the center portion and at the same time causes the dough pieces to roll as illustrated by the arrows in Fig. 2. The roll R is thus gradually divided into the split dumb-bell shaped dough pieces B (Figs. 3 and 5). The skin of the dough piece B is continuous and unbroken. The short stalk S connects the two halves, facilitating the panning of the twin roll.

I have found that it is preferable that the lowest point A of rod 56 be positioned in advance of the end of conveyor 35. By permitting the stalk S to rise, the dumbbell dough pieces B roll more evenly and disengage immediately from rod 56. Where the lowest point A is the end of rod 56, an undesirable hesitation on the part of the dough pieces B was noted. The gate 64 momentarily halts the dough pieces B on the delivery plate 58. This aligns the row and permits a few drops of oil to be applied from the valve faucets 156. Gate 64 and faucets 156 are both operated through rod 130, the faucets opening as the gate closes.

The dough pieces are next arrested by gate 66 which closes as gate 64 opens. This breaks the momentum of the dough pieces and times its delivery into cup 164 of pan G. This synchronization is more fully described in my co-pending application, Serial No. 262,744, now Patent No. 2,750,899. The inclined delivery plate 58 has a gutter 166 to catch excess oil so it does not fall on pans G or the pan conveyor 162.

The modified molding channel 170 illustrated in Fig. 6 differs from molding channels 36 shown in Figs. 1, 2, 3, 4 and 5 by providing channel 170 with a detachable canvas (or equivalent) liner 172. Selection of canvas strips 172 of various thickness permits variation of the width of the channel without affecting the centerline. Such a change may be done without tools or measuring instruments. Each thumb screw 174 engages a threaded hole in a bracket 176 secured to the U-shaped molding channel 170.

Figure 9:
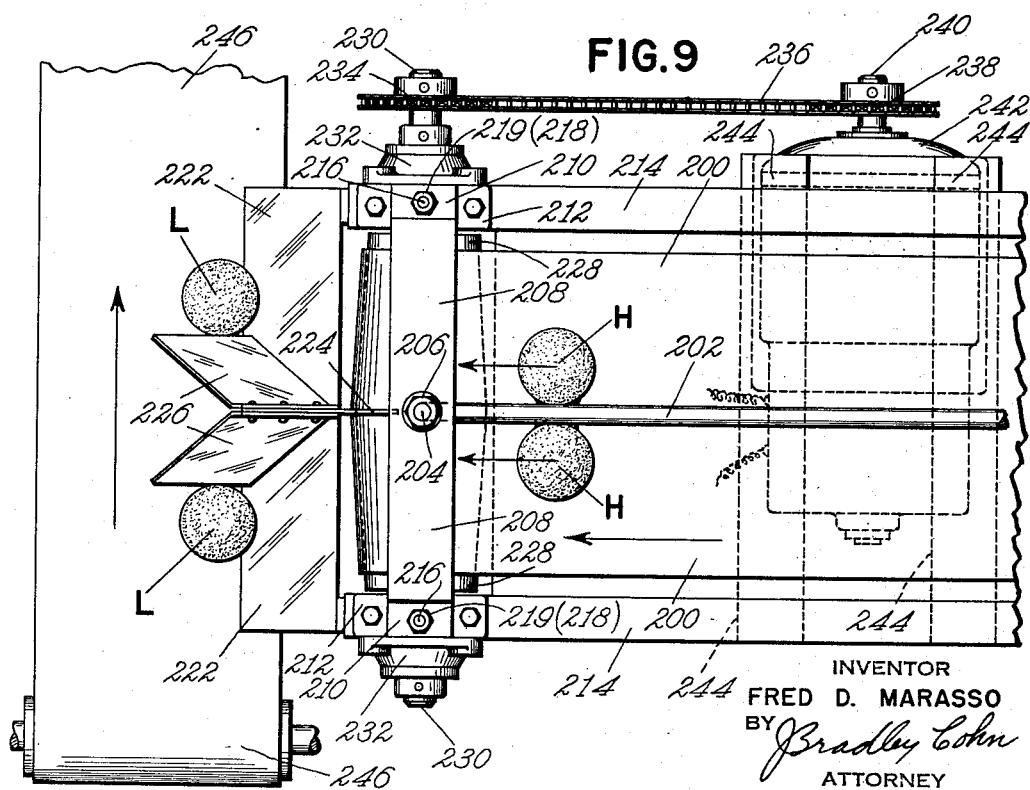
Fig. 9 is a plan view taken on line 9—9 of Fig. 7.

My invention may also be used to make split loaves. Such an embodiment of my invention is shown in Figs. 7, 8 and 9. A continuously running conveyor 200 moves beneath a suitable molding channel (not shown) of similar structure and design to a channel 36 or 170 in Figs. 1 to 6. A divider rod 202 slopes from the trailing end of the channel toward conveyor belt 200 to a point of substantially zero clearance. This last end of rod 202 is adjustably and yieldably supported as follows: the flange 210 of a bracket 208 is yieldably held against a plate 212 of machine frame member 214 by a spring 220 seated against jam nuts 218–219 on bolt 216 of plate 212. The rod 202 is adjustably supported in the bracket by means of a pair of nuts 206 which receive a threaded vertical end 204 of rod 202.

A delivery slide plate 222 is secured to frame member 214 adjacent the end of belt 200. A divided plate 224 extends from the vertical end 204 of rod 202 around the end of conveyor belt 200 to and along plate 224 to which it is fastened. Delivery slide plate 222 also supports a pair of deflector plates 226 which are secured plow fashion to upright divider plate 224.

Conveyor belt 200 is driven by a crown pulley 228 and led over an idler crown pulley (not shown). The shaft 230 of drive pulley 228 is supported at each end by bearing brackets 232 secured to frame members 214. Shaft 230 carries a sprocket 234 driven by chain 236 from gear reduction motor 242 by sprocket 238 on motor shaft 240. Motor 242 is secured to bars 244 mounted on the frame members 214.

In operation, single large dough pieces are deposited at spaced intervals on conveyor belt 200 which carries them through the molding channel and beneath the sloping divider rod 202. The forward motion of the belt, of course, produces a rolling motion when the dough piece contacts the inner top of the stationary molding channel. This rolling motion (as indicated by the arrow in Fig. 7) continues as the dough piece passes beneath the divider rod 202. This rolling motion forms the two spherical dough pieces H without wounding the skin. Finally, the crown shape of the belt (Fig. 8) causes the halves H to separate completely as the rod 202 approaches zero clearance with belt 200. Deflector plates 226 are designed to properly space the split loaves L on the cross conveyor belt 246. Twin loaves connected by a stalk as in the case of the twin rolls may be produced by removing divider and deflector plates 224 and 226 and adjusting end 204 of rod 202 upwardly.

Where in the making of twin rolls it is desired to cover the entire surface of the skin of the twin rolls with oil instead of just the dividing portion, the machine may be provided with a modified delivery plate 250 illustrated in Figs. 10 and 11. Plate 250 is corrugated to form a plurality of parallel troughs 252. Plate 250 is mounted on a cross bar 254 secured on its two ends to brackets 62 of the machine. Valve faucets 156 are spaced to drop oil on each half B rather than into the dividing crevice between the two halves of the dough pieces. The spherical halves then rolling down each in its individual trough will distribute the oil over the entire surface of their skin and the core or stalk between each two halves will ride over the elevated edge of two adjacent troughs 252, as illustrated in Fig. 11. No change is required in co-acting gates 64 and 66 nor in faucet 156 and their operating mechanism. A horizontal leader 260 is mounted at the bottom of trough 250 to collect the excess oil.

From the foregoing, it will be understood that my invention relates to a method and mechanism for dividing a dough lump and molding each half into a sphere by rolling the dough lump on a surface by means of a blunt member which advances progressively into the dough lump, dividing it in half. The relative motion between the blunt member and the surface draws the skin of the dough lump downward and around each of the halves while at the same time rolling the dividing dough lump to round each of the two segments.

I claim:

1. A molding machine having an endless horizontal conveyor adapted to receive dough portions during spaced intervals to convey them in seriatim, said conveyor moving from a receiving end to a delivery end, a device for depositing dough pieces on said horizontal conveyor adjacent a receiving end thereof, an inverted U-shaped channel positioned above and along said conveyor and extending therealong for at least a short distance and a substantially horizontal bar inclined gradually downwardly from substantially the central end portion of said channel to a point toward the delivery end of said conveyor, said bar approaching the surface of said conveyor whereby portions of dough deposited on said conveyor are formed into cylindrically shaped rolls by contact with the inside of said inverted U-shaped cylinder and then said roll is progressively molded by said horizontal rod to form a dumb-bell shaped twin.

2. In a molding apparatus, a horizontal endless conveyor having an upper operative run moving from a receiving end to a delivery end, means to feed a dough ball to the receiving end of said operative run, an inverted channel member mounted above and in close adjacency to said operative run of said conveyor and extending a short distance therealong, said channel member being disposed to receive said dough balls deposited on the receiving end of said conveyor to shape said balls into a cylindrical form as it moves through said channel member on said operative run, a bar inclined downwardly from a point near the trailing end of said channel member toward the delivery end of said operative run, said bar progressively approaching the surface of said delivery run to a point almost in contact therewith, said bar then tapering upwardly for a short distance from said operative run whereby said cylindrically shaped dough piece is progressively molded into two balls connected by a thin stalk having a single continuous skin and a general dumb-bell shaped conformation.

3. In an apparatus for molding a twin or split roll, the combination of means to deliver a dough lump to the receiving end of a continuously running endless conveyor, a horizontal continuously running endless conveyor mounted to receive dough lumps, an inverted channel member mounted above said conveyor and longitudinal therewith, an elongated rod inclined downwardly from the central end portion of said inverted channel progressively toward said conveyor to a point near the delivery end of said conveyor and in very close proximity with the surface of said conveyor, then progressively inclined upwardly from said conveyor toward its delivery end.

4. An apparatus substantially as set forth in claim 3, further characterized by having means to apply oil to the connecting stalk of said dumb-bell shaped dough lump as it emerges from beneath said horizontal rod.

5. An apparatus substantially as set forth in claim 4, further characterized by a gate adjacent said oil applying means and operative to momentarily arrest said dough lump at said oil applying means.

6. A molding apparatus comprising, means for progressively advancing a series of dough pans, a horizontal endless conveyor positioned above said means and moving parallel thereto, means to deliver at spaced timed intervals transverse rows of dough lumps to the upper run of said horizontal conveyor, a plurality of inverted channel members mounted above said upper run and longitudinal thereof to engage and guide said lumps therealong, said members being mounted in a row transverse said conveyor, each of said channel members being disposed to receive one of said lumps in said transverse row during movement of said conveyor, said endless conveyor moving said lump in and beneath said inverted channel to form said lump into a cylinder, and a plurality of horizontal rods extending from a point adjacent the upper central trailing edge of said inverted channel members and extending along said horizontal run and inclining toward said horizontal run to a point almost in contact with said horizontal run, so that said horizontal rods will contact the center of said cylindrical rolls as they are advanced by said conveyor and progressively mold them by coaction between said rods and said conveyor whereby said rolls are formed into two spheres connected by a single stalk.

7. An apparatus substantially as set forth in claim 6, further characterized by means adjacent the delivery end of said conveyor to apply oil to the connecting stalk of said dumb-bell shaped dough lump as it emerges from beneath said horizontal rod.

8. A molding apparatus for forming twin or split rolls, the combination with an endless conveyor, of an elongated rod spaced from the upper surface of said conveyor and inclined thereto in the direction of movement of said conveyor, a gate mounted at the delivery end of said conveyor and moveable to and from a position to arrest an object on said conveyor, means adjacent said gate to apply lubricating liquid to an object momentarily arrested by said gate, and means to drive said conveyor to move a dough lump beneath said rod to mold said dough lump to form a dumb-bell shaped lump connected by a stalk-like portion of dough.

9. In an apparatus, a horizontal endless conveyor having an upper operative run, means to feed a dough ball to the receiving end of said operative run, an inverted channel mounted in close adjacency to said operative run of said conveyor and extending a short distance therealong, said channel being disposed from said conveyor a distance to engage said dough balls deposited on the receiving end of said conveyor to confine and locate said balls moving along said operative run, a bar inclined downwardly from a point on the central end portion of said channel member toward the delivery end of said conveyor run, said bar being inclined to progressively approach the surface of said conveyor run to a point almost in contact therewith, said bar then extending a short distance beyond said conveyor run, and a cuneal deflector plate supporting at its apex said extension of said bar, said cuneal deflector plate being operative to sever the connecting stalk of a pair of dough lumps formed beneath said bar on said operative run.

10. In a molding apparatus, a horizontal endless conveyor having an upper operative run, means to feed a dough ball to the receiving end of said operative run, an inverted channel mounted in close adjacency to said operative run of said conveyor and extending a short distance therealong, said channel member being disposed at a distance from said conveyor to engage, confine and guide said dough balls deposited on the receiving end of said conveyor to shape said balls into a cylindrical form as they move through said channel on said operative run, a bar inclined downwardly from a point on the central end portion of said channel toward the delivery end of said operative run, said bar being inclined progressively to approach the surface of said delivery run to a point almost in contact therewith, a delivery slide mounted at the end of said operative run, and a pair of deflector plates mounted on said delivery slide, said deflector plates being formed as an isosceles wedge having its apex and longitudinal axis in line with said bar whereby dough lumps may be divided by coaction between said operative run and said bar into two rounded lumps having a continuous skin and connected by a thin stalk and said wedge may sever said stalk to form two separate lumps.

11. In an apparatus for dividing dough lumps in two, an endless conveyor having an upper horizontal operative run, a longitudinal horizontal bar spaced from and running along said operative run and converging to a point almost in contact with said conveyor in the direction of travel thereof, and said conveyor being mounted on crown rollers, the crown of said rollers being beneath said horizontal bar, whereby a dough lump will be molded and substantially divided by said bar, and urged apart by the shape of the crown rollers.

12. In an apparatus for dividing dough lumps in two, an endless conveyor having an upper horizontal operative run, an inverted channel member mounted above and at the beginning of said operative run and longitudinal thereto, a longitudinal horizontal bar running the remainder of the distance along said operative run and converging from a point adjacent the upper central trailing edge of said inverted channel to a point almost in contact with said conveyor, said conveyor being mounted on crown rollers, the crown of said rollers being beneath said horizontal bar, and deflector plates diverging from each other in the direction of movement of said conveyor and mounted subsequent to said bar with respect to the direction of movement of said conveyor to divide and space dough lumps rolled beneath said horizontal bar.

References Cited in the file of this patent
UNITED STATES PATENTS

| | | |
|---|---|---|
| 1,167,187 | Lauterbur | Jan. 4, 1916 |
| 1,305,127 | Lawson | May 27, 1919 |
| 1,633,014 | Harber | June 21, 1927 |
| 1,816,844 | Harber | Aug. 4, 1931 |
| 2,017,281 | Kirchhoff | Oct. 15, 1935 |
| 2,162,079 | Grabowski et al. | June 13, 1939 |
| 2,243,338 | Harber | May 27, 1941 |
| 2,431,074 | Palmer | Nov. 18, 1947 |
| 2,479,864 | Rhodes | Aug. 23, 1949 |